US011998831B2

(12) United States Patent
Lewis

(10) Patent No.: US 11,998,831 B2
(45) Date of Patent: Jun. 4, 2024

(54) MAGNETIC SKATEBOARD ACCESSORY SYSTEM

(71) Applicant: The Order Fulfillment Group Inc., Zionsville, IN (US)

(72) Inventor: Edward D. Lewis, Zionsville, IN (US)

(73) Assignee: The Order Fulfillment Group Inc., Zionsville, IN (US)

( * ) Notice: Subject to any disclaimer, the term of this patent is extended or adjusted under 35 U.S.C. 154(b) by 0 days.

(21) Appl. No.: 18/239,608

(22) Filed: Aug. 29, 2023

(65) Prior Publication Data

US 2024/0066384 A1 Feb. 29, 2024

Related U.S. Application Data

(60) Provisional application No. 63/401,885, filed on Aug. 29, 2022.

(51) Int. Cl.
*A63C 17/26* (2006.01)
*F21S 9/02* (2006.01)
*F21V 21/096* (2006.01)

(52) U.S. Cl.
CPC ................ *A63C 17/26* (2013.01); *F21S 9/02* (2013.01); *F21V 21/096* (2013.01); *A63C 2203/14* (2013.01)

(58) Field of Classification Search
CPC ........ A63C 17/26; A63C 2203/14; F21S 9/02; F21V 21/096
USPC .................................................. 362/486, 398
See application file for complete search history.

(56) References Cited

U.S. PATENT DOCUMENTS 8,469,569 B1 6/2013 Tunnicliffe et al.
8,672,719 B2 3/2014 Grimes et al.
9,366,404 B1 6/2016 Porter et al.
9,604,125 B2 3/2017 Page et al.
9,878,230 B1 1/2018 Seele
10,888,766 B2 1/2021 Grantham et al.
2003/0075890 A1 4/2003 Jacobs
2005/0030746 A1 2/2005 Goode et al.
2008/0036165 A1 2/2008 Reinson
2009/0236811 A1 9/2009 Lewis
2012/0092886 A1* 4/2012 Calhoun ................ A63C 17/26 362/459
2013/0228990 A1 9/2013 Baldauf et al.
2014/0312582 A1 10/2014 Scolari
2017/0326434 A1* 11/2017 Faeth ................... F16M 13/022

(Continued)

FOREIGN PATENT DOCUMENTS

CA 2892732 11/2016

OTHER PUBLICATIONS

"Illume V2.5," webpage <https://www.etsy.com/listing/715453171/illume-v25-longboarde-board-headlight>, retrieved May 22, 2021.

(Continued)

*Primary Examiner* — Laura K Tso

(57) ABSTRACT

A skateboard accessory system may be provided including a base and at least one magnet. The base includes a leg. The base is adapted to receive an accessory. The leg includes a foot adapted to be positioned against a deck of a skateboard. The magnet is positioned within the foot of the leg. The magnet is adapted to magnetically couple the base to the heads of at least two truck bolts.

20 Claims, 5 Drawing Sheets

(56) References Cited

U.S. PATENT DOCUMENTS

2021/0077892 A1 3/2021 Desberg

OTHER PUBLICATIONS

"ShredLights" webpage <https://shredlights.com/collections/led-skateboard-longboard-lights/products/sl-200-two-pack>, retrieved May 22, 2021.

* cited by examiner

MAGNETIC SKATEBOARD ACCESSORY SYSTEM

CROSS-REFERENCE TO RELATED APPLICATIONS

This application claims priority of Provisional Application Ser. No. 63/401,885 filed Aug. 29, 2022, entitled "Magnetic Skateboard Lighting System."

TECHNICAL FIELD

This disclosure relates to accessories related to deck-based sporting equipment and, in particular, to magnetic accessory systems for skateboards and electronic skateboards (e-boards).

BACKGROUND

The statements in this section merely provide background information related to the present disclosure and may not constitute prior art.

Skateboards are commonly used as fun and convenient travel accessories, particularly in urban environments. However, skateboarding at night requires the use of a lighting system. Helmet-mounted lights may be used but are positioned far from the ground and may provide inadequate vision for the user. Lighting systems have been incorporated into the truck and baseplate of the skateboard, but this has numerous issues. First, a lighting system incorporated into the truck, and therefore below the deck, may be too close to the ground to provide adequate illumination over uneven terrain. Second, a lighting system incorporated into the truck may be challenging and time-consuming to install. Third, the lighting system must have an electrical supply meaning that a separate electrical supply must incorporated into the skateboard, or the lighting system must be removed to be recharged, which may be time-consuming. Fourth, a lighting system rigidly fixed to the truck or baseplate may be easily damaged if the skateboard encounters difficult terrain. A lighting system for a skateboard which may be easily installed, detached, and recharged is desirable. Further, a lighting system for a skateboard which may provide adequate lighting of upcoming terrain is also desirable.

SUMMARY

Further areas of applicability will become apparent from the description provided herein. It should be understood that the description and specific examples are intended for purposes of illustration only and are not intended to limit the scope of the present disclosure.

In one embodiment, a skateboard accessory system is provided including a base and at least one magnet. The base includes a leg. The base is adapted to receive an accessory. The leg includes a foot adapted to be positioned against a deck of a skateboard. The magnet is positioned within the foot of the leg. The magnet is adapted to magnetically couple the base to the heads of at least two truck bolts.

In another embodiment, a skateboard lighting system is provided including a base, a plurality of magnets, and a light. The base includes multiple legs. Each of the legs includes a foot adapted to be positioned against a deck of a skateboard. Each magnet is arranged within the foot of one of the plurality of legs. The magnet is adapted to magnetically couple the base to heads of at least two truck bolts of the skateboard. The light is coupled to the base.

In yet another embodiment, a skateboard accessory system is provided including a base, at least two magnets, and an electrical accessory. The base includes a top, a bottom, at least two legs, and at least two feet. The feet are arranged within each of the legs at the bottom of the base. The magnets are each arranged within one of the feet. The electrical accessory is coupled to the top of the base.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In one example, a skateboard accessory system is provided including a base and at least one magnet. The base includes a leg. The base is adapted to receive an accessory. The leg includes a foot adapted to be positioned against a deck of a skateboard. The magnet is positioned within the foot of the leg. The magnet is adapted to magnetically couple the base to the heads of at least two truck bolts.

One technical advantage of the systems and methods described below may be that the skateboard accessory system described herein may be located above the deck of the skateboard, providing ideal illumination to see upcoming terrain even in uneven situations.

Another technical advantage of the systems and methods described below may be that the skateboard accessory system described herein may be easily installed onto the skateboard, by merely magnetically coupling the skateboard accessory system to the deck of a skateboard. The magnetic coupling may provide additional advantages by allowing the skateboard accessory system to be easily detached for electrical recharging. Also, the magnetic coupling may allow the skateboard accessory system to more easily decouple from the skateboard in the event of a crash, minimizing damage to the skateboard accessory system.

Figure 1:
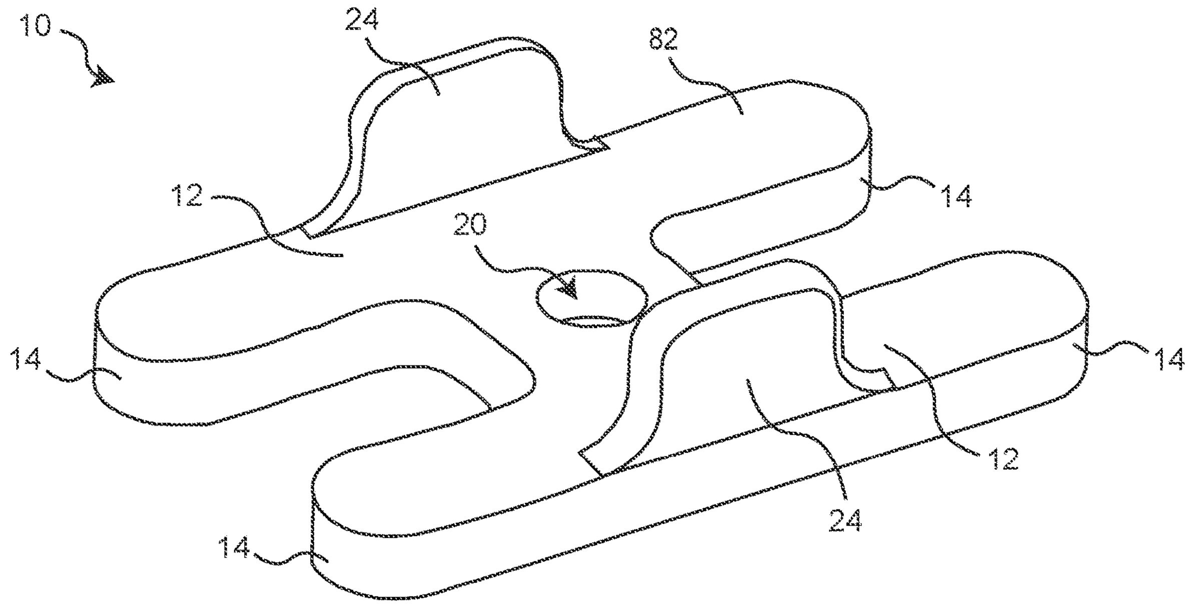
FIG. 1 illustrates a top perspective view of an example of a skateboard accessory system including a body, legs, and feet.
Figure 2:
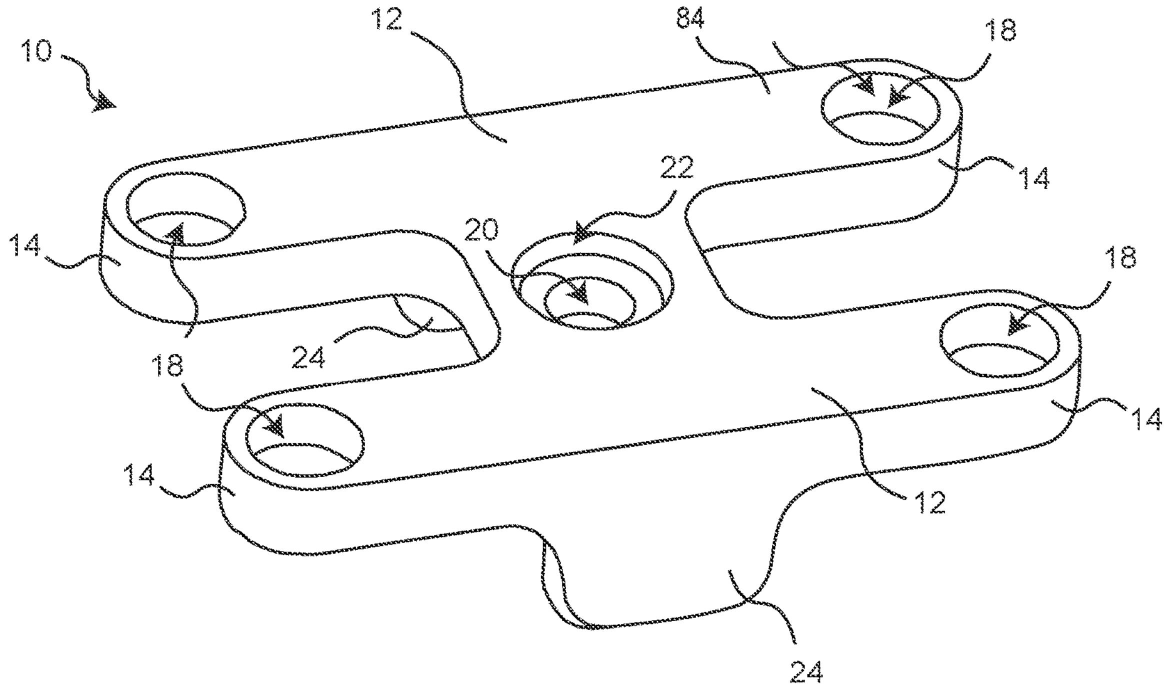
FIG. 2 illustrates a bottom perspective view of the example of a magnetic skateboard accessory system of FIG. 1, including the body, legs, and feet.

FIGS. 1 and 2 illustrate perspective views of a skateboard accessory system including a base 10, legs 12, and feet 14. The base 10 may be any component of the skateboard accessory system which may be coupled to the deck (26 in FIG. 3) of a skateboard and upon which may be coupled an accessory (40 in FIG. 4). Examples of the base 10 may include a platform, a block, or a truss. The base 10 may extend from a bottom 84 to a top 82 and may include one or more legs 12. The base 10 may be made of a material such as aluminum, steel, or a plastic such polyurethane.

The legs 12 may be any portion of the base 10 which extend outward from the center of the base 10. The legs 12 may extend to cover at least a portion of the heads (38 in FIG. 3) of the truck bolts (30 in FIG. 3) of a skateboard. Examples of the legs 12 may include pylons, elongated protrusions, or a circular plate. As illustrated in FIGS. 1 and 2, the legs 12 may be spaced apart from one another coupled by other portions of the base 10. The base 10 may include a left leg 12 and a right leg 12 arranged to cover the left and right truck bolts 30, respectively.

Figure 5:
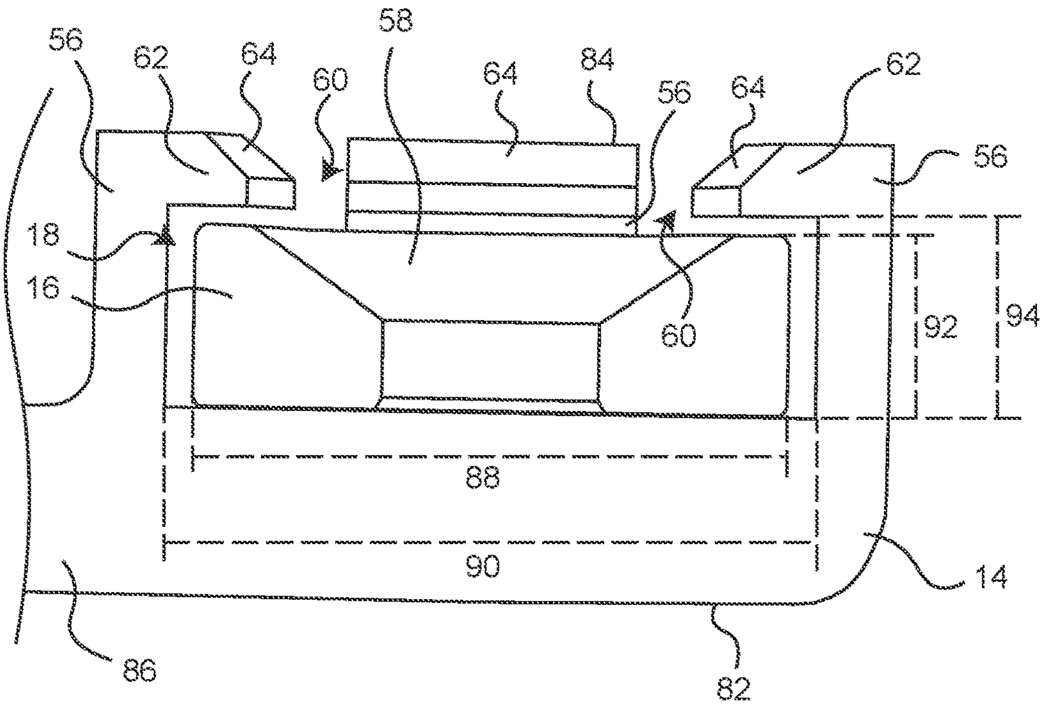
FIG. 5 illustrates a side cross-sectional view of a first example of a foot of a magnetic skateboard accessory system including a magnet and digits.

The foot 14 may be any portion of the leg 12 which is adapted to be positioned over a truck bolt 30 and which may house a magnet (16 in FIG. 5). Each foot 14 may be adapted to be positioned against the deck 26 of the skateboard. In some embodiments, as illustrated in FIGS. 1 and 2, each leg 12 may have two feet 14 such that each truck bolt 30 is covered by a foot 14.

The base 10 may extend from a top 82 to a bottom (84 in FIG. 2). The bottom 84 of the base 10 may have a surface which is flat or curved to be adapted to the deck 26 of the skateboard. The top 82 of the base 10 may be adapted to receive the accessory 40. In such embodiments, the base 10 may define a mounting opening 20 which extends from the top 82 to the bottom 84 of the base 10. A securing element (54 in FIG. 4) may extend from the bottom 84 of the base 10 to be coupled to the accessory 40, thereby coupling the accessory 40 to the top 82 of the base 10. The bottom 84 of the base 10 may include a mounting depression 22 encircling the mounting opening 20 such that an element head (80 in FIG. 4) of the securing element 54 may not protrude from the flat surface of the bottom 84 of the base 10.

In some embodiments, the skateboard accessory system may include one or more tabs 24 extending upward from the top 82 of the base 10. In some embodiments, a first tab 24 may be positioned on a first side of the base 10 and a second tab 24 may be positioned on a second side of the base 10. The tabs 24 may be adapted to constrain the position of the accessory 40 relative to the base 10. In such embodiments, the tabs 24 may help guide the accessory 40 into the mounting opening 20 to ease the installation process. Alternatively, the tabs 24 may constrain the rotational movement of the accessory 40 within the mounting opening 20, for example, as constraining the directionality of an accessory 40 such as a flashlight.

As illustrated in FIG. 2, each foot 14 may define a magnet cavity 18. The magnet cavity may 18 be shaped to house and contain one of the magnets 16. Each of the magnet cavities 18 may be defined from the bottom 84 of the base 10 to maximize the magnetic connection between the magnets 16 and the heads 38 of the truck bolts 30 of the skateboard, thereby securing the base 10 to the deck 26 of the skateboard.

Figure 3:
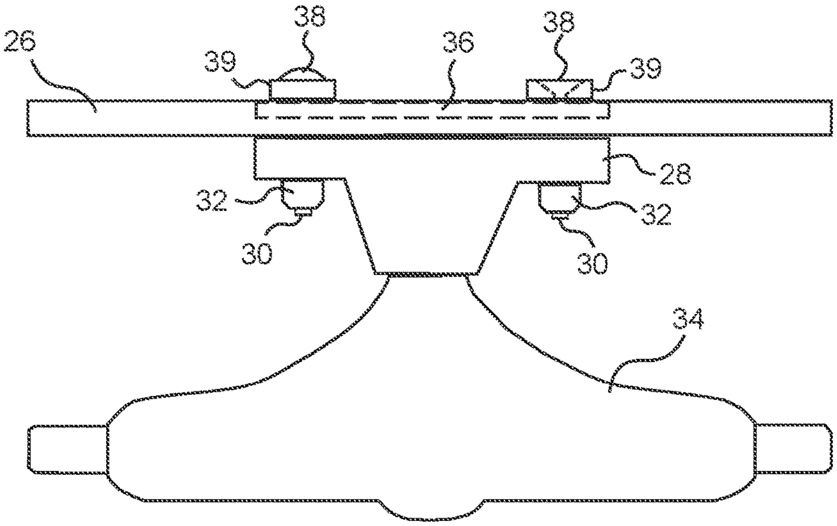
FIG. 3 illustrates a front cross-sectional view of an example of a skateboard including a deck, a truck, an upper plate, and truck bolts.

FIG. 3 illustrates a cross-sectional view of an example of the skateboard. The skateboard may be any vehicle having wheels and which is adapted for a user to stand on while in conveyance. Examples of the skateboard may include a non-electronic, traditional skateboard or an electrically propelled skateboard (e-board). The skateboard may include a deck 26, and a truck. The deck 26 may be any platform adapted to receive the feet of the user. Examples of the deck 26 may include a board, a disc, or a plank.

The truck may be any portion of the skateboard which is adapted to have wheels and is coupled to the deck. The truck may include a baseplate 28 and an axle 34. The baseplate 28 of the truck may be coupled to the deck 26 by truck bolts 30 passing through the deck 26 and the baseplate 28. The truck bolts 30 may be coupled to the baseplate 28 and the deck 26 by truck nuts 32 threaded onto the truck bolts 30. The truck bolts 30 may have heads 38 secured against the deck 26, while the truck nuts 32 may be secured against the baseplate 28 below the deck 26. The heads 38 may be flat and recessed into the surface of the deck 26, or may be rounded to protrude above the deck 26. The truck bolts 30 and heads 38 may be made of a magnetic material such as iron, nickel, cobalt, or an alloy containing one of those metals such as steel.

In some embodiments, an upper plate 36 may be included. The upper plate 36 may be any component which is secured by the truck bolts 30 above the deck 26. The upper plate 36 may be made of a metal to better engage with the heads 38 of the truck bolts 30. In some embodiments, the deck 26 may have a recessed cavity in which the upper plate 36 may be positioned, as illustrated in FIG. 3.

In some embodiments, a magnetic washer 39 may be between the head 38 of the truck bolt 30 and the deck 26 of the skateboard. The magnetic washer 39 may be made of a magnetic material such as iron, nickel, or cobalt, or an alloy thereof. The magnetic washer 39 may be used to enhance the magnetic attachment force between the magnets 16 of the base 10 and the heads 38 of the truck bolts 38. For example, in one embodiment without the magnetic washer 39, the magnet 16 may be held to the head 38 of the truck bolt 30 with approximately 8.8 pounds of force. In another embodiment with the magnetic washer 39 and a rounded head 38 for the truck bolt 30, the magnet 16 may be held to the head 38 of the truck bolt 30 with approximately 15.4 pounds of force. In another embodiment wherein a flat head 38 of the truck bolt 30 is recessed into the magnetic washer 39, the magnet 16 may be held to the head 38 of the truck bolt 30 with approximately 22.0 pounds of force.

Two to six truck bolts 30 may be used to secure the truck to the deck 26 of the skateboard though typically four truck bolts 30 may be used. The skateboard may include both forward and rear trucks (not shown), such that the skateboard is balanced on four wheels. In such embodiments, truck bolts 30 may be used to secure both trucks to the deck 26 of the skateboard. Additionally, in such embodiments, two bases 10 may be used to couple to both the front and back sets of truck bolts 30. For example, the back base 10 may be coupled to a red light accessory 40 and the front base 10 may be coupled to a wide-angle headlight accessory 40.

In such an embodiment, the bases 10 and accessories 40 may be used on the skateboard to approximate regulation street vehicle running lights.

Figure 4:
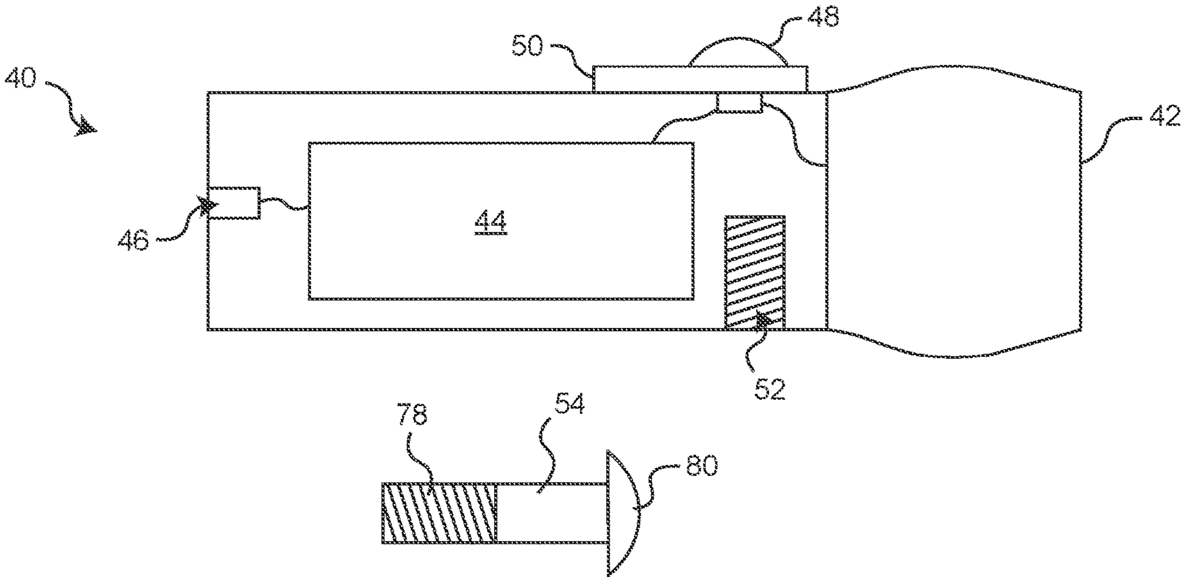
FIG. 4 illustrates a side cross-sectional view of an example of a lighting system including a lighting element, an energy source, and a securing element.

FIG. 4 illustrates a cross-sectional view of an example of the accessory 40. The accessory 40 may be any electrical component which may be mounted onto the base 10. Examples of the accessory 40 may include an electric light, a horn, a Light Detecting and Ranging Sensor (LIDAR), a foot-operated bell, or a camera. The accessory 40 may include an energy source 44, a switch 48, a shell 86, and a charging port 46. A lens 42 may be included as well if the accessory 40 is a light to direct or spread light coming from the accessory 40. The accessory 40 may be detachably coupled to the base 10 or may be integrated with the base 10.

The energy source 44 may be any component of the accessory 40 which may provide electrical power to the accessory 40, such as a battery. The switch 48 may be any component which may electrically activate the accessory 40, such as an on/off button. The shell 86 may be any component of the accessory 40 which encloses all or some of the other components of the accessory 40. The charging port 46 may be any opening defined in the shell 86 by which the energy source 44 may be electrically charged, such as a universal serial bus (USB) port. For example, in some embodiments, the light, the switch 48, the energy source 44 and the charging port 46 may all be electrically coupled.

In some embodiments, the accessory may also include an engagement surface 50 which is adapted to engage with the surface of the base 10 to secure the position of the accessory 40 relative to the base. For example, as illustrated in FIG. 4, the engagement surface 50 may be a raised surface which interacts with a portion of the base 10 to hold the accessory 40 in place. Alternatively, the engagement surface 50 may be a telescoping outer surface having a diminishing diameter which may be friction-fit into a receptacle (72 in FIG. 8) of the base 10.

The shell 86 of the accessory 40 may also define a securing opening 52 adapted to receive a securing element 54. The securing opening 52 may be arranged at a bottom of the accessory 40 to allow the accessory 40 to be secured to the top 82 of the base 10. The securing opening 52 may be threaded. The securing element 54 may be any component which may extend between the bottom 84 of the base 10 and the securing opening 52 of the accessory 40 to secure the accessory 40 to the base 10. The securing element 54 may include a threaded portion 78 which may interact with the threaded surface of the securing opening 52. The securing element 54 may also include an element head 80 which may be secured against the bottom 84 of the base 10.

FIG. 5 illustrates a cross-sectional view of one of the feet 14 including the magnet 16 and several digits 56. The magnet 16 may be any component which allows the base 10 to be magnetically coupled to the heads 38 the truck bolts 30 of the skateboard. In some embodiments, a single magnet 16 may be coupled to the heads 38 of at least two truck bolts 30. In other embodiments, each magnet 16 may be coupled to individual heads 38 of truck bolts 30, such that that the plurality of magnets 16 for a base 10 may be coupled to at least two heads 38 of the truck bolts 30. The magnets 16 may be made of any magnetic material such as iron, cobalt, or nickel. Each foot 14 may have an outer shell which defines a magnet cavity 18 to contain each magnet 16. The magnets 16 should have sufficient magnetic force that at least 17.6 pounds of force may be used to separate the base 10 from the heads 38 of the truck bolts 30. In such an embodiment, the base 10 will remain attached to the skateboard even over bumpy and uneven terrain. The magnets 16 should also have a maximum magnetic force such that no more than 88.0 pounds of force may be used to magnetically decouple the base 10 from the heads 38 of the truck bolts 30. In such an embodiment, the user will be able to easily remove the base 10 from the skateboard when the accessory 40 may be recharged.

A portion of the outer shell of the foot 14 may be divided into several digits 56 encircling the magnet cavity 18 and separated from adjacent digits 56 by gaps 60 in the outer shell. The digits 56 may be more flexible than other portions of the outer shell, allowing the digits 56 to bend and flex slightly to make installation of the magnet 16 into the magnet cavity 18 easier. The digits 56 may also as a shock absorber between the deck 26 of the skateboard and the magnet 16, allowing the base to remain coupled to the deck 26 even when rolling over uneven surfaces.

Each digit 56 may include an overhang 62 extending under the magnet cavity 18. Each overhang 62 may restrain the movement of the magnet 16 within the magnet cavity 18, preventing the magnet 16 from exiting the magnet cavity 18. The overhang 62 may be aligned with the bottom 84 of the base 10 to allow the magnet 16 to be as close to the head 38 of the truck bolts 30 as possible. The overhang 62 may also have a sloped outer surface 64. The sloped outer surface 64 may assist in installing the magnet 16 into the magnet cavity 18, as the magnet 16 may be pressed down against the sloped outer surface 64 to bend the digits 56 slightly outward to allow the magnet 16 to enter the magnet cavity 18. The sloped outer surface 64 may also be shaped to accommodate the rounded head 38 of the truck bolts 30, allowing the heads 38 to be as close as possible to the magnet 16 and increase magnetic attraction. The magnet 16 may also have a lower surface 58 with a concave shape shaped to accommodate the rounded head 38 of the truck bolts 30, allowing the heads 38 to be as close as possible to the magnet 16 and increase magnetic attraction.

In some embodiments, the magnet cavity 18 may be slightly larger than the magnet 16. The extra space of the magnet cavity 18 may act as a shock absorber for the magnet 16, allowing the base 10 to remain coupled to the deck 26 even when rolling over uneven surfaces. For example, a height of the magnet cavity 18 (94), from the upper surface of the magnet cavity 18 to the overhang 62, may be at least 0.0625 inches larger than a height of the magnet 16 (92). Similarly, a diameter of the magnet cavity 18 (90) may be at least 0.0625 inches larger than a diameter of the magnet 16 (88).

Figure 6:
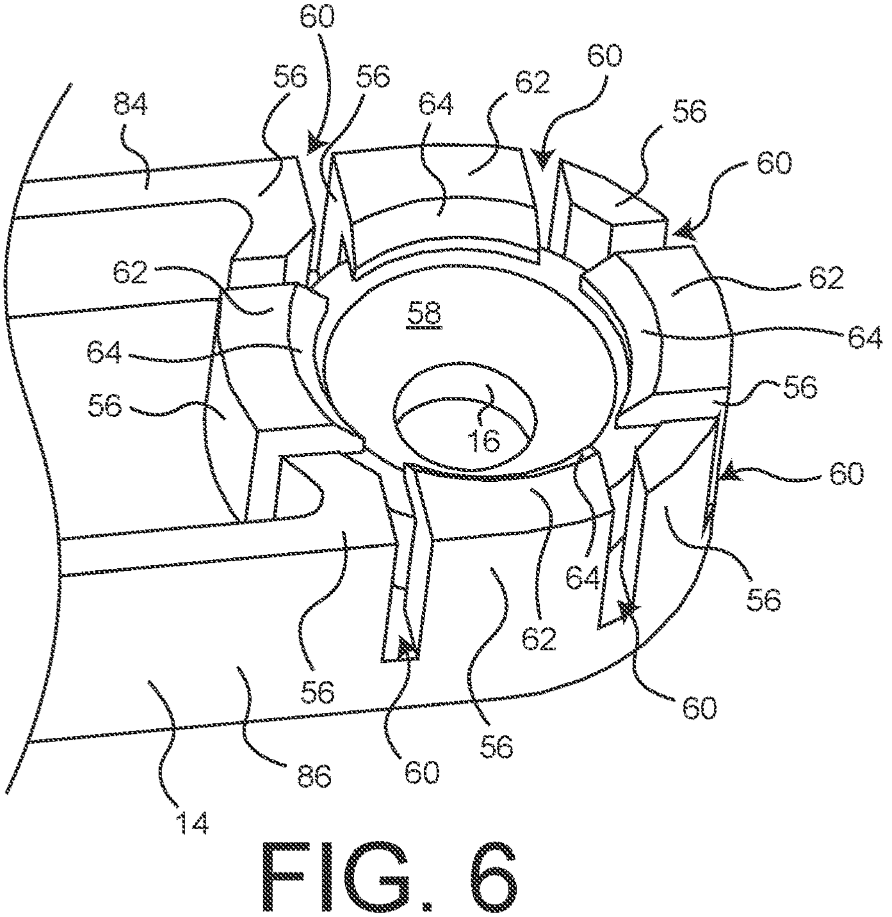
FIG. 6 illustrates a bottom perspective view of a second example of a foot of a magnetic skateboard accessory system including a magnet and digits.

FIG. 6 illustrates a perspective view of another example of one of the feet 14. As illustrated, some embodiments of the foot 14 may include up to eight digits 56. Some digits 56 may be more fully coupled to the outer shell of the foot 14. Some digits 56 may not include overhangs 62 and only restraint lateral movement of the magnet 16. The foot 14 may include between two and four overhangs 62.

Figure 7:
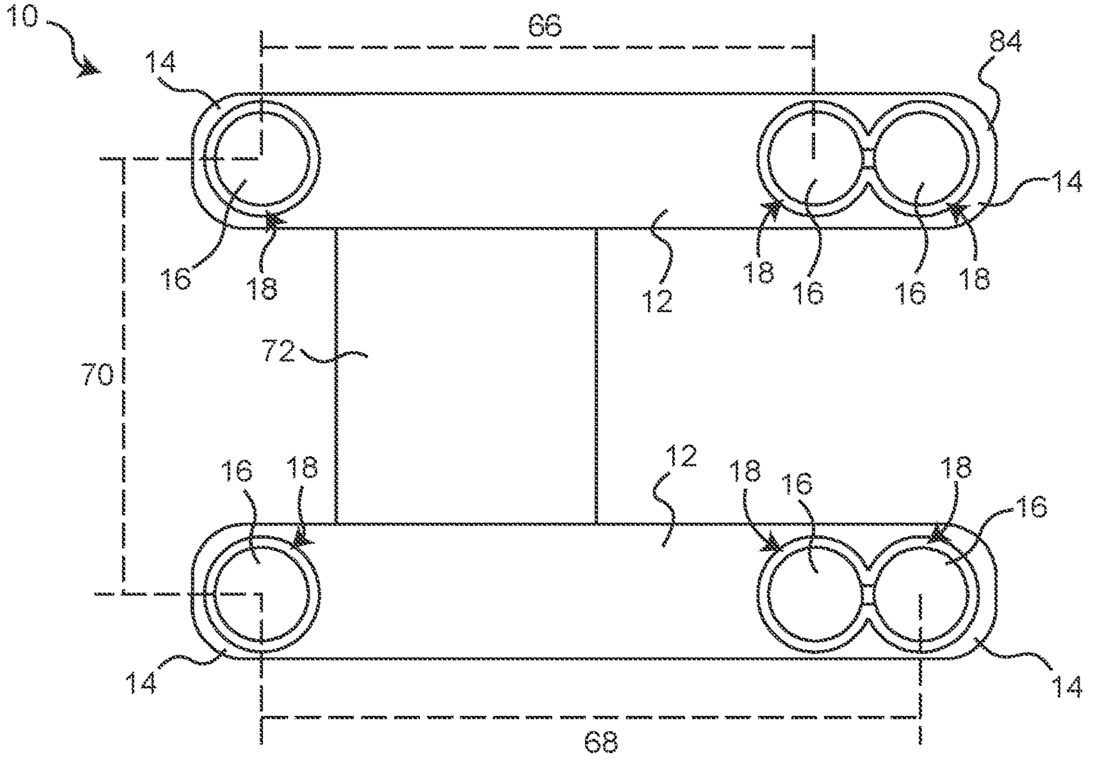
FIG. 7 illustrates a bottom plan view of a second example of a skateboard accessory system including magnets, a body, legs, and feet.

FIG. 7 illustrates a bottom view of another example of the base 10 include six magnets. In such an embodiment, the base 10 may include two legs 12 and each leg 12 may include three feet 14 to accommodate three magnets 16. The legs 12 may be spaced apart by approximately 1.625 inches (70). The three magnets 16 may be a front magnet 16, a rear magnet 16, and an interior magnet 16 positioned between the front magnet 16 and the rear magnet 16. For the purposes of truck bolt 30 and magnet 16 spacing, the term "approximately" may be construed as meaning plus or minus the diameter of the head 38 of a truck bolt 30, typically between 0.053 inches and 0.062 inches.

Skateboard decks 26 and trucks typically have two standards in spacing between the truck bolts 30 from the front to the rear of the truck. A first standard spaces the truck bolts approximately 2.125 inches apart from each other from the front to the rear. A second standard spaces the truck bolts approximately 2.5 inches apart from each other from the front to the rear.

The spacing of the magnets 16 within the legs 12 may correspond to the two standards for truck bolt 30 spacing on skateboards. For example, where only two magnets 16 may be present in each leg 12, each front magnet 16 may be spaced apart from the respective rear magnet 16 by approximately 2.125 inches (66) or 2.5 inches (68), depending on the standard upon which the base 10 is designed to be used with. In another example, as in FIG. 7, each front magnet 16 may be spaced apart from the respective rear magnet 16 by approximately 2.5 inches (68) to fit the second standard. The interior magnet 16 may be spaced apart from either of the rear magnet 16 or the front magnet 16 by approximately 2.125 inches (66) to fit the first standard. In such an embodiment as illustrated in FIG. 7, the spacing of the magnets 16 in each leg 12 may allow the base 10 to be coupled to the truck bolts 30 used in either the first standard or the second standard.

Figure 8:
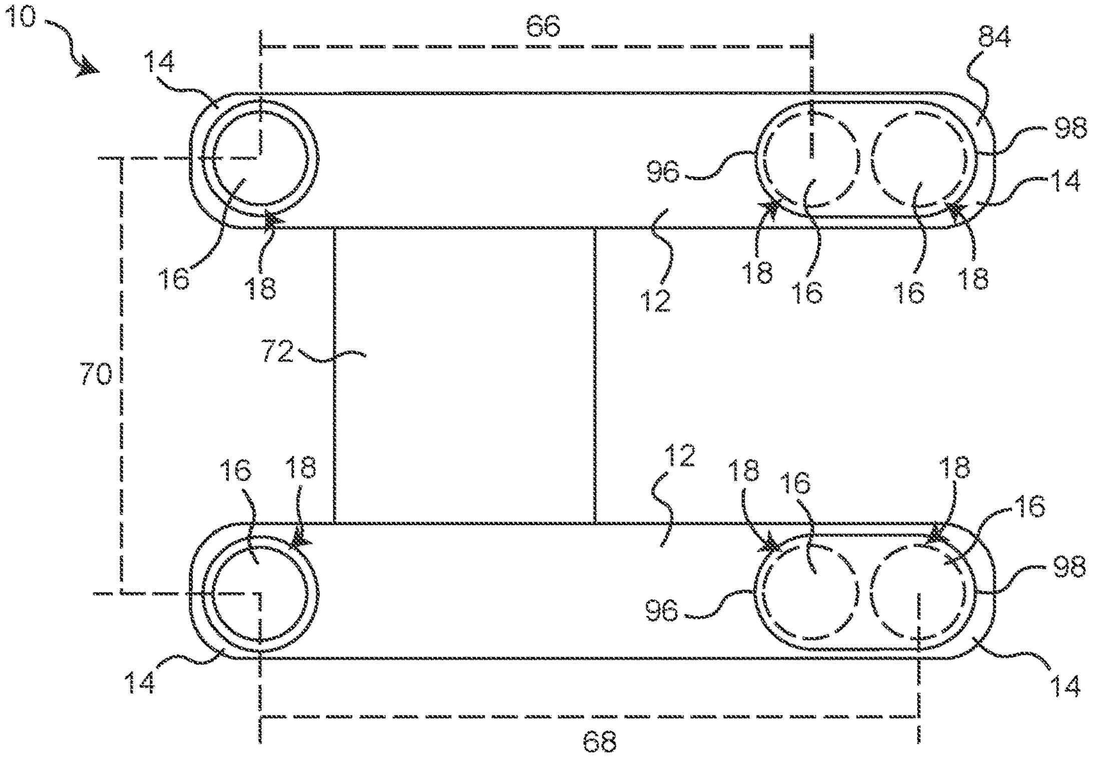
FIG. 8 illustrates a bottom plan view of a third example of a skateboard accessory system including magnets, a body, legs, and feet.

FIG. 8 illustrates a bottom view of an example of another base 10 similar to that shown in FIG. 7. In some embodiments, the magnet cavity 18 on one of the feet 14 in each leg 12 may be elongated to allow the magnet 16 to move from a first end 96 to a second end 98 of the elongated magnet cavity 18. The elongated magnet cavity 18 may be arranged such that when the magnet 16 is located at the first end 96 of the elongated magnet cavity 18, the spacing between the magnets 16 may be approximately 2.125 inches (66), fitting the first standard for truck bolts 30. When the magnet 16 is located at the second end 96 of the elongated magnet cavity 18, the spacing between the magnets 16 may be approximately 2.5 inches (68), fitting the second standard for truck bolts 30. In such an embodiment, the base 10 may be coupled with truck bolts 30 arranged in either standard using only two magnets 16 in each leg 12.

Figure 9:
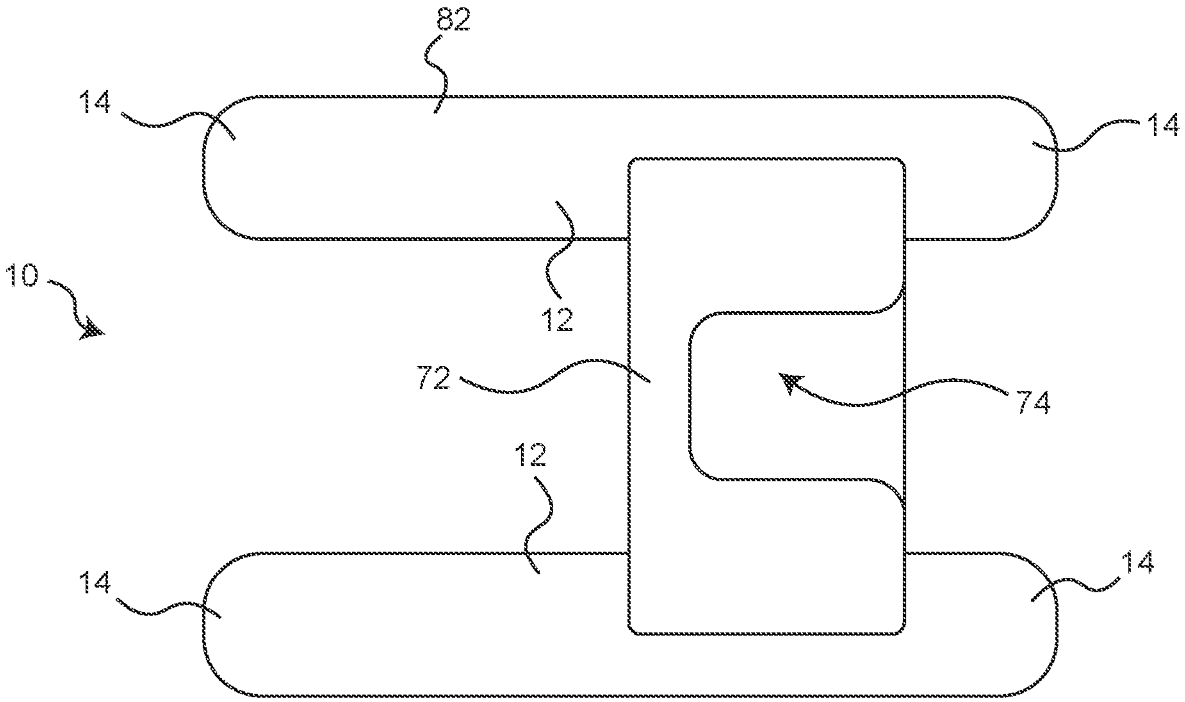
FIG. 9 illustrates a top plan view of the example of a magnetic skateboard accessory system of FIG. 8, including the body, legs, feet, and an accessory receptacle.

FIG. 9 illustrates top view of the example of the base 10 shown in FIG. 8 including an accessory receptacle 72. The accessory receptacle 72 may be any component which extends upward from the base 10 to receive the accessory 40. For example, the accessory receptacle 72 may be a circular structure defining a central shaft through which the accessory 40 may be positioned. Alternatively, the accessory receptacle 72 may be a pair of tongs partially encircling and gripping the accessory 40. In some embodiments, the accessory receptacle 72 may include a notch 74 formed in the surface of the accessory receptacle 72. The notch 74 may be adapted to interact with the engagement surface 50 of the accessory 40 to constrain the position of the accessory 40 with respect to the base 10.

Figure 10:
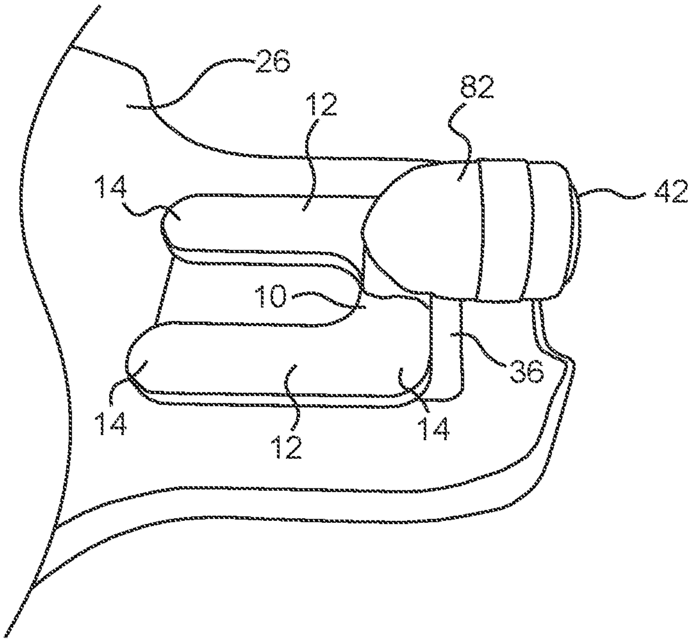
FIG. 10 illustrates a perspective view of a second example of a skateboard including a magnetic skateboard accessory system.

FIG. 10 illustrates a perspective view of another example of the base 10 magnetically coupled to the deck 26 of the skateboard. As illustrated, in some embodiments, the base 10 may form a unitary body such that the accessory 40 and the magnets 16 are contained within the unitary body of the base 10. In such an embodiment, the unitary body of the base 10 may be formed from a single material in a single process.

Furthermore, although specific components are described above, methods, systems, and articles of manufacture described herein may include additional, fewer, or different components. For example, in some embodiments, up to four feet 14 may be arranged within each leg 12. In such an embodiment, each foot 14 may have a magnet cavity 18 containing a magnet 16. Additionally, in some embodiments, the legs 12 may be curved to accommodate unusual and complex arrangements of truck bolts 30.

In addition to the advantages that have been described, it is also possible that there are still other advantages that are not currently recognized but which may become apparent at a later time. While various embodiments have been described, it will be apparent to those of ordinary skill in the art that many more embodiments and implementations are possible. Accordingly, the embodiments described herein are examples, not the only possible embodiments and implementations.

I claim:

1. A skateboard accessory system comprising:
- a base comprising a leg, wherein the base is adapted to receive an accessory and the leg comprises a foot adapted to be positioned against a deck of a skateboard; and
- at least one magnet positioned within the foot of the leg, wherein the at least one magnet is adapted to magnetically couple the base to heads of at least two truck bolts of the skateboard.

2. The skateboard accessory system of claim 1, wherein the base comprises at least two legs and a magnet is arranged in the foot of each leg.

3. The skateboard accessory system of claim 2, wherein at least two magnets are arranged within respective feet of each leg.

4. The skateboard accessory system of claim 3, wherein the at least two magnets of each leg comprises a front magnet and a rear magnet and within each leg, each front magnet is spaced apart from the respective rear magnet by approximately 2.125 inches.

5. The skateboard accessory system of claim 2, wherein:
- at least three magnets are arranged within respective feet of each leg;
- the at least three magnets of each leg comprises a front magnet, a rear magnet, and an interior magnet positioned between the front magnet and the rear magnet;
- within each leg, each front magnet is spaced apart from the respective rear magnet by approximately 2.5 inches and the interior magnet is spaced apart from one of the respective rear magnet or the respective front magnet by approximately 2.125 inches.

6. The skateboard accessory system of claim 1, wherein the magnet comprises a lower surface having a concave shape adapted to receive the head of one of the truck bolts.

7. The skateboard accessory system of claim 1, wherein:
- each foot has an outer shell defining a cavity adapted to receive the magnet;
- the cavity has a height which is at least 0.0625 inches larger than a height of the magnet; and
- the cavity has a diameter which is at least 0.0625 inches larger than a diameter of the magnet.

8. The skateboard accessory system of claim 7, wherein a portion of the outer shell of each foot is divided into at least three digits and each digit is separated from any adjacent digit by a gap in the outer shell.

9. The skateboard accessory system of claim 1, further comprising an accessory detachably coupled to the base.

10. The skateboard accessory system of claim 9, wherein the accessory comprises an electric light enclosed within a shell.

11. The skateboard accessory system of claim 10, further comprising a first tab and a second tab extending upward from the base, wherein the first tab is positioned on a first side of the base, the second tab is positioned on a second side of the base, and the first tab and the second tab are adapted to constrain movement of the accessory between the first side and the second side of the base.

12. The skateboard accessory system of claim 9, further comprising a securing element, wherein the securing element is adapted to extend through the base and couple to the accessory to secure the accessory to the base.

13. A skateboard lighting system comprising:

a base comprising a plurality of legs, wherein each of the plurality of legs comprises a foot adapted to be positioned against a deck of a skateboard;

a plurality of magnets, wherein each magnet is arranged within the foot of one of the plurality of legs and the magnet is adapted to magnetically couple the base to heads of at least two truck bolts of the skateboard; and a light coupled to the base.

14. The skateboard lighting system of claim 13 wherein the base comprises a unitary body and the light and magnet are contained within the unitary body of the base.

15. The skateboard lighting system of claim 13, further comprising an energy source electrically coupled to the light, wherein an outer surface of the base defines a charging port electrically coupled to the energy source and the light.

16. The skateboard lighting system of claim 13, wherein the magnet is adapted to require no more than 17.6 pounds of force to be magnetically decoupled from the truck bolts of the skateboard.

17. The skateboard lighting system of claim 13, wherein the magnet is adapted to require at least 88.0 pounds of force to be magnetically decoupled from the truck bolts of the skateboard.

18. A skateboard accessory system comprising:

a base comprising a top, a bottom, at least two legs, and at least two feet, wherein at least one of the at least two feet are arranged within each of the at least two legs and at the bottom of the base;

at least two magnets, wherein each magnet is arranged within one of the at least two feet; and an electrical accessory which is coupled to the top of the base.

19. The skateboard accessory system of claim 18, wherein each of the at least two magnets comprises a lower surface having a concave shape.

20. The skateboard accessory system of claim 18, wherein the electrical accessory is detachably coupled to the top of the base by a securing element extending between the electrical accessory and the bottom of the base.

* * * * *